United States Patent
Patil et al.

(10) Patent No.: US 9,380,513 B2
(45) Date of Patent: Jun. 28, 2016

(54) REDUCING BROADCAST DUPLICATION IN HYBRID WIRELESS MESH PROTOCOL ROUTING

(71) Applicant: QUALCOMM Incorporated, San Diego, CA (US)

(72) Inventors: Abhishek Pramod Patil, San Diego, CA (US); George Cherian, San Diego, CA (US); Santosh Paul Abraham, San Diego, CA (US); Soo Bum Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 27 days.

(21) Appl. No.: 14/279,717

(22) Filed: May 16, 2014

(65) Prior Publication Data
US 2015/0334629 A1 Nov. 19, 2015

(51) Int. Cl.
| | | |
|---|---|---|
| H04W 40/12 | (2009.01) | |
| H04W 40/02 | (2009.01) | |
| H04W 40/24 | (2009.01) | |
| H04L 12/721 | (2013.01) | |
| H04W 84/18 | (2009.01) | |

(52) U.S. Cl.
CPC ............ H04W 40/12 (2013.01); H04L 45/123 (2013.01); H04W 40/02 (2013.01); H04W 40/244 (2013.01); H04W 84/18 (2013.01)

(58) Field of Classification Search
CPC .................................................... H04W 40/12
USPC .......................................................... 370/338
See application file for complete search history.

(56) References Cited

U.S. PATENT DOCUMENTS

| | | | |
|---|---|---|---|
| 8,351,896 B2* | 1/2013 | Purnadi | H04W 4/22 370/328 |
| 8,447,875 B2 | 5/2013 | Liu et al. | |
| 8,516,256 B2 | 8/2013 | Vogt et al. | |
| 8,982,908 B1* | 3/2015 | Shukla | H04L 45/745 370/389 |
| 2005/0243765 A1 | 11/2005 | Schrader et al. | |
| 2006/0285529 A1 | 12/2006 | Hares et al. | |
| 2007/0025309 A1 | 2/2007 | Yano et al. | |
| 2007/0110024 A1 | 5/2007 | Meier | |

(Continued)

FOREIGN PATENT DOCUMENTS

WO  WO-2011083389 A1  7/2011

OTHER PUBLICATIONS

Bahr, Michael; Update on the Hybrid Wireless Mesh Protocol of IEEE 802.11s, 1-4244-1455-5/07/$25.00 © 2007 IEEE.*

(Continued)

*Primary Examiner* — Melvin Marcelo
*Assistant Examiner* — Peter Solinsky
(74) *Attorney, Agent, or Firm* — Holland & Hart LLP

(57) ABSTRACT

Methods, systems, and devices related to wireless communication via a mesh network are described. In particular, the disclosure is directed to selecting a path between two nodes in a wireless mesh network based on consideration of type of data requested and a determination whether an intermediate node, within a predetermined range of the requesting node, is actively broadcasting the requested data. Such opportunistic consideration in selecting a path between two nodes may avoid unnecessary activation of additional broadcasting nodes and reduce the risk of triggering interference between multiple nodes broadcasting duplicate data.

48 Claims, 13 Drawing Sheets

(56) References Cited

U.S. PATENT DOCUMENTS

| | | | |
|---|---|---|---|
| 2007/0127421 A1 | 6/2007 | D'Amico et al. | |
| 2007/0177511 A1* | 8/2007 | Das | H04L 45/42 370/238 |
| 2007/0260878 A1 | 11/2007 | Urivskiy et al. | |
| 2008/0065884 A1 | 3/2008 | Emeott et al. | |
| 2008/0095059 A1* | 4/2008 | Chu | H04L 12/66 370/238 |
| 2009/0252134 A1* | 10/2009 | Schlicht | H04L 1/0015 370/338 |
| 2010/0061272 A1 | 3/2010 | Veillette | |
| 2010/0074194 A1* | 3/2010 | Liu | H04L 45/124 370/329 |
| 2010/0142421 A1* | 6/2010 | Schlicht | H04W 4/20 370/310 |
| 2010/0172249 A1* | 7/2010 | Liu | H04L 45/124 370/252 |
| 2010/0322141 A1* | 12/2010 | Liu | H04W 24/10 370/315 |
| 2012/0044949 A1 | 2/2012 | Velev et al. | |
| 2013/0042313 A1 | 2/2013 | Lambert | |
| 2013/0051250 A1 | 2/2013 | Shaffer et al. | |
| 2013/0265909 A1 | 10/2013 | Park et al. | |
| 2013/0283347 A1 | 10/2013 | Hui et al. | |
| 2013/0294284 A1 | 11/2013 | Popa et al. | |
| 2014/0003295 A1* | 1/2014 | Gossain | H04L 12/2838 370/256 |
| 2014/0056129 A1* | 2/2014 | Wen | H04W 40/12 370/229 |
| 2015/0092606 A1* | 4/2015 | Kelsey | H04L 41/12 370/255 |
| 2015/0264627 A1* | 9/2015 | Perdomo | H04W 40/12 370/329 |
| 2015/0334631 A1 | 11/2015 | Patil et al. | |

OTHER PUBLICATIONS

IEE Std 802.11s-2011.*
Avula, Moo, Lee; Secure Hybrid Wireless Mesh Protocol (SHWMP), Feb. 4, 2014.*
Islam et al., "A Secure Hybrid Wireless Mesh Protocol for 802.11s Mesh Network", Computational Science and Its Applications—ICCSA 2008, Lecture Notes in Computer Science, Jun. 30, 2008, pp. 972-985, URL: http://www.researchgate.net/publication/225436073_A_Secure_Hybrid_Wireless_Mesh_Protocol_for_802.11s_Mesh_Network, XP019091476, ISBN: 978-3-540-69838-8, Springer-Verlag Berlin Heidelberg.
ISA/EPO, Partial International Search Report of the International Searching Authority, Int'l App. No. PCT/US2015/025109, Feb. 25, 2016, European Patent Office, Rijswijk, NL, 6 pgs.
Lee et al., "A New MIMC Routing Protocol Compatible with IEEE 802.11s Based WLAN Mesh Networks," The International Conference on Information Networking 2011 (ICOIN2011), Barcelona, Jan. 26-28, 2011, pp. 126-131, ISBN 978-1-61284-663-7, XP_31922493A, Institute of Electrical and Electronics.

* cited by examiner

Step 4

Step 3

REDUCING BROADCAST DUPLICATION IN HYBRID WIRELESS MESH PROTOCOL ROUTING

CROSS-REFERENCE TO RELATED APPLICATIONS

This application is related to U.S. Non-Provisional patent application Ser. No. 14/279,612 by Patil et al., entitled ESTABLISHING RELIABLE ROUTES WITHOUT EXPENSIVE MESH PEERING, filed on May 16, 2014.

BACKGROUND

The following relates generally to wireless communication, and more specifically to wireless communications via a mesh network. Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of base stations or access points, each simultaneously supporting communication for multiple mobile devices. Each base station or access point provides a limited coverage range and couples to a core network a via wired backhaul communication. However, deploying large number of base stations or access points with wired infrastructure may not be cost effective. An alternative to the traditional method of wireless communication includes wireless mesh networks where mobile devices (and other wireless communication devices) may form networks without base stations or equipment other than the mobile devices themselves.

Wireless mesh networks are dynamically self-organized and self-configured with nodes in the network automatically establishing an ad-hoc network with other nodes such that the network connectivity is maintained. In a mesh network topology, each node relays data for the network and all nodes cooperate in the distribution of data within the network. As a result, a message in the mesh network is transmitted from a source node to the destination node by being propagated along a path, hopping from one node to the next until the destination is reached. Conventional methods select a path between the source node and the destination node based on factors such as an airtime link between each node. Such methods, however, fail to consider the type of data (e.g., unicast message or broadcast traffic) requested or whether an existing intermediate node exists between the two nodes that may readily satisfy the request as a basis for selecting a path between the source and the destination node.

SUMMARY

The described features generally relate to one or more improved systems, methods, and/or apparatuses for communications via a mesh network. In particular, the present disclosure is directed to selecting a path between two nodes in a wireless mesh network based on consideration of type of data requested and a determination whether an intermediate node, within a one-hop reach of the requesting node, is actively broadcasting the requested data. Such opportunistic consideration in selecting a path between two nodes may avoid unnecessary activation of additional broadcasting nodes and reduce the risk of triggering interference between multiple nodes broadcasting duplicate data.

In a first set of illustrative examples, a method for wireless communication is provided. The method may comprise receiving, at a node, a first message from an originating node and selecting a path to the originating node based at least in part on a link weight between the node and the originating node. In some examples, the link weight may indicate whether at least one intermediate node, along the path to the originating node, is a broadcaster and transmitting a second message to the originating node on the selected path. The link weight may be a weighted sum of at least one or more of bit error rate, link quality, signal strength, or hop count.

In some examples, the first message may be a path request (PREQ) message to form a data path between a source node and the originating node. The second message may be a path reply (PREP) message. In certain examples, the node may be two-hops removed from the originating node and a first of the at least one intermediate node may be one-hop removed from the originating node. The method may further comprise activating the first intermediate node to broadcast traffic upon determining that no broadcaster exists within a one-hop count of the originating node. Activating the first intermediate node to broadcast traffic may comprise transmitting the second message to the first intermediate node. In some examples, the method for wireless communication may further determine that the received first message is a path request for broadcast traffic, wherein the determining is based in part on at least one or more reserved bits in the first message. At least one intermediate node, along a least cumulative link weight path, may further be identified as a broadcaster based in part on one or more reserved bits in the first message.

In a second set of illustrative examples, a method for wireless communication is provided from the perspective of an intermediate node. The method may comprise receiving, at a first node, a message from an originating node and determining that the first node is broadcasting traffic requested by the originating node in the message. Based in part on the determination, the first node may update at least one reserved bit in the message and forward the message to the second node.

In some examples, the first node may be an intermediate node one-hop removed from the originating node and the second node may be at least one of second intermediate node or a source node. The second node, in some examples, may be two-hops removed from the originating node along the path to a source of broadcast traffic. The updating of at least one bit in the message may comprise updating at least one reserved bit in the PREQ message to identify the first node as a broadcaster. In some examples, the method may further comprise receiving, at the first node, a route announcement (RANN) message from a source node and refreshing a path to the source node by transmitting a path request (PREQ) message to the source node in response to the RANN message. The RANN message may comprise at least one of source media access control (MAC) address, a sequence number, a hop count, and a metric field. The source node may further be identified at least in part on one of MAC addresses of the source node, or a unique identification derived from the MAC address.

In a third set of illustrative examples, an apparatus for wireless communication is provided from the perspective of an intermediate node. The apparatus may comprise a processor and a memory in electronic communications with the processor. The memory may embody instructions executable by the processor to receive, at a source node, a first message from an originating node and select a path to the originating node. The selection may be based at least in part on a link weight between the source node and the originating node. The link weight may indicate whether at least one intermediate node, along the path to the originating node, is a broadcaster and transmit a second message to the originating node on the selected path.

In certain examples, the apparatus of the third illustrative configuration may be configured to implement one or more aspects of the functionality described above with reference to the method of the first illustrative configuration.

According to a fourth illustrative configuration, an apparatus for wireless communication is provided from the perspective of an intermediate node. The apparatus may comprise a processor and a memory in electronic communications with the processor. The memory may embody instructions executable by the processor to receive, at a first node, a message from an originating node and determine that the first node is broadcasting traffic requested by the originating node in the message. Based in part on the determination, the first node may update at least one bit in the message and forward the message to a second node.

In certain examples, the apparatus of the fourth illustrative configuration may be configured to implement one or more aspects of the functionality described above with reference to the method of the second illustrative configuration.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
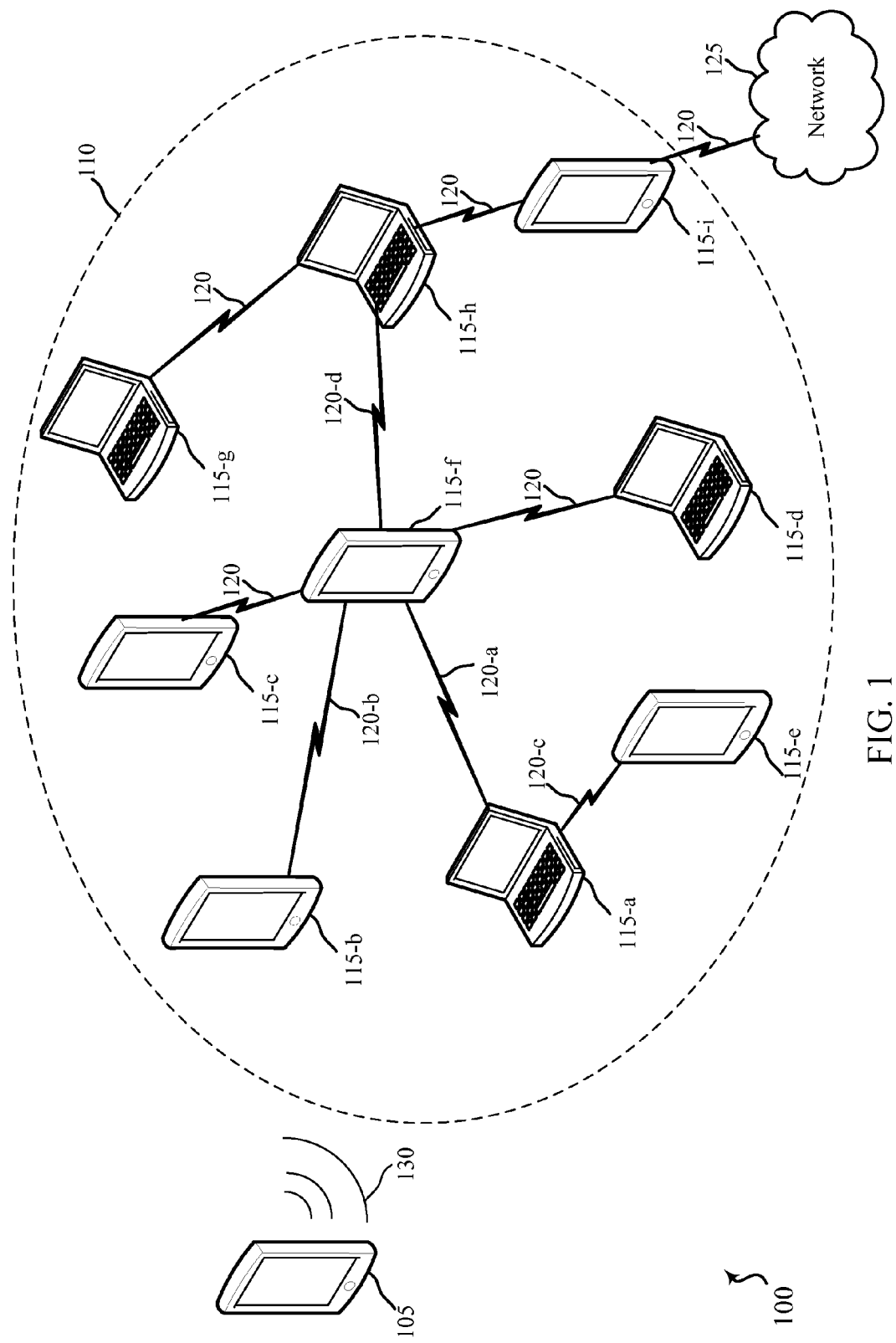
FIG. 1 shows a block diagram of a mesh network with a new wireless communication device in proximity.

A mesh network may be a full mesh network in which each member device has a connection with every other device of the network. Also, a mesh network may be a partial mesh network in which some member devices may be connected in a full mesh scheme, but other member devices are only connected to one or more of the devices, but not all of the member devices of the network. Further, social Wi-Fi mesh networks may extend the capabilities of a social Wi-Fi framework to enable participating devices to establish mesh connectivity for content delivery. Mesh networks may be formed between a device and one or more other devices to provide one or more services to the device from the other device(s). It is contemplated that a node in a social Wi-Fi mesh network may be any one of mesh routers or mesh clients, such as mesh point, mesh access point, mesh portal point and/or mesh station. In a social Wi-Fi mesh and for the purpose of this disclosure, a new station or node joining the mesh may generally be referred to as an originator node. Similarly, the source of broadcast traffic (i.e., service provider) in the mesh network may be referred as a source node throughout the specification.

Paths between a source node and an originator node may be built using a route request/route reply management frames. For instance, when the originator node needs to transmit a frame or request to the source node for which no path exists, a path request (PREQ) message initiated by the originator node may be broadcast throughout the mesh network. An intermediate node(s) within the range of the originator node may receive the broadcasted PREQ message and route the PREQ message to the source node via any number of intermediate node(s). As the PREQ message is propagated, intermediate node(s) receiving the PREQ message may create reverse routes to the source node. When the source node receives a PREQ message destined to itself, the source node may respond with a path reply (PREP) message which may be sent back to the originator node via the intermediate node(s). The intermediate node(s) may forward the PREP message back to the originator node based on an optimum path selection calculated by each intermediate node(s). As a result, when the originator node receives the PREP message, it establishes a path to the source node via the final intermediate node that transmits the PREP message to the originator.

In an illustrated embodiment, the optimum path selected between the source node and the originator node may vary based on the type of data requested (e.g., unicast message or broadcast traffic). A unicast message traverses in the mesh network from the source node to a single network destination identified by a unique address based on arbitrary metrics. In contrast, a broadcast traffic comprises simultaneous transmission of data from a source node to all possible network destinations within a particular range. Additional intermediate broadcasters may be utilized in the network to extend the coverage area of the broadcast source traffic.

Therefore, when an originator node requests subscription for broadcast traffic from a source node (e.g., service provider), it may be optimal to distinguish between the type of data requested (i.e., unicast or broadcast) and utilize the existing intermediate broadcasters in the network to service the requesting node. Such opportunistic consideration in selecting a path between two nodes avoids unnecessary activation of additional broadcasting nodes and reduces the risk of triggering interference between multiple nodes broadcasting duplicate data.

Referring first to FIG. 1, an arrangement 100 is shown that includes an established mesh network 110. The mesh network 110 may be implemented as a wired or wireless communication network of various fixed and/or mobile devices, that may be referred to as "nodes" 115 of the mesh network 110. Each of the node devices 115 may receive and communicate data throughout the mesh network, such as throughout a college campus, metropolitan area, community network, and across other geographic areas. A node device 115 may also function to route data from one node to another within the mesh network. In addition, each node typically has more than one communication link to and/or from other nodes of the network, which provides for redundant communication links and a reliable communication system.

The wireless mesh network 110 may include various node devices 115 implemented for wireless communication utilizing a data packet routing protocol, such as Hybrid Wireless Mesh Protocol (HWMP) for path selection. The wireless mesh network 110 may also be implemented for data communication with other networks that are communicatively linked to the mesh network 110, such as with another wireless network, wired network, wide-area-network (WAN), and the like.

In the wireless mesh network 110, communication links 120 may be formed between the various nodes 115 of the network. The data packets for wireless communication in the network may be forwarded or routed from a source node (e.g., transmitting device) to an originator node (e.g., receiving device) via intermediate node(s), which are commonly referred to as "hops" in a multi-hop wireless mesh network. For instance, communication from a first node 115-$a$ to second node 115-$f$ via communication link 120-$a$ may be considered "one-hop." Similarly, communication between a first node 115-$a$ to a third node 115-$h$ via intermediate node 115-$f$ and communication links 120-$a$ and 120-$d$ may be considered "two-hops" for the purpose of this disclosure. Communication between multiple devices, however, is not limited to either one or two hops, and may comprise any number of hops required for establishing communication between a plurality of mobile devices via the selected path.

In one example, wireless communication device 105 may be in proximity of the mesh network 110. As previously discussed, the mesh network 110 may include a plurality of nodes 115, which may be wireless communication devices.

As shown in FIG. 1, the mesh network 110 is a partial mesh network, with connections or communication links 120 established between the nodes 115-$a$ through 115-$i$ such that each of the nodes may communicate with all of the other nodes of the mesh network 110, some directly and some indirectly. The mesh network 110 may be connected to an external network 125, such as the Internet, by one or more of the member devices (e.g., device 115-$i$ in this example) establishing a connection or communication link 120 with the external network 125. Although not shown, the device 115-$i$ may establish its connection with a base station that has access to the external network 125.

In one configuration, a node 115-$f$ of the mesh network 110 may be a source node broadcasting traffic (e.g., streaming video/audio, data), while nodes 115-$a$, $b$, $c$, $d$, and $h$ within the range of 115-$f$ may be subscriber nodes. In general, a node that is a source of a particular service may be referred to as a provider or source node; a node that uses a particular service may be referred to as a subscriber. However, it is contemplated that any node 115 may be a source node or the subscriber node. In the exemplary configuration, at least one subscriber node 115-$a$ and/or 115-$h$ may further broadcast the received traffic from the source node 115-$f$ to additional subscriber nodes 115-$e$, 115-$g$, and 115-$i$ that may be outside the effective range of the source node 115-$f$.

In one example of the above configuration, a new node 105 in proximity of the mesh network 110 may seek broadcast traffic stream from the source node 115-$f$. As a result, new node (originator) 105 may broadcast a PREQ message to the mesh network 110 via wireless link 130. Intermediate nodes 115-$a$ and 115-$b$ within the range of the originator node 105 may each receive the broadcasted PREQ message and route each PREQ message to the source node 115-$f$ via communication signals 120-$a$ and 120-$b$ respectively. In response to the received PREQ message, the source node 115-$f$ may respond with a PREP message to the originator node 105 via one of the intermediate nodes 115-$a$ or 115-$b$. In the specified example, the originator node 105 may be in closer proximity to the intermediate node 115-$b$ than the corresponding node 115-$a$. Nonetheless, a source node 115-$f$ may select a path to the originator node via intermediate node 115-$a$ based in part on the determination that the intermediate node 115-$a$, within a one-hop reach of the originator node, is actively broadcasting the requested data (i.e., broadcasting data to 115-$e$ via communication link 120-$c$).

In contrast, if the original request by the mobile device 105 had been a request for unicast message, the source node 115-$f$ may select a path via the intermediate node 115-$b$ as opposed to node 115-$a$ based on metrics prioritizing the proximity of the two nodes. Therefore, in some examples of the present disclosure, a source node 115-$f$ may select different paths to the originator node based on the type of data requested by the originator and the dynamics of the mesh network.

Figure 2A:
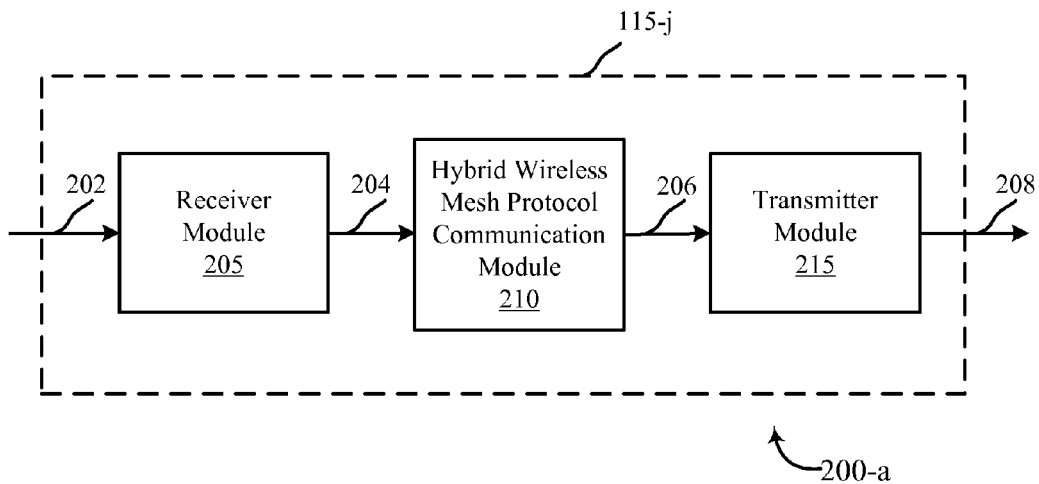
FIG. 2A is a block diagram illustrating an example of a wireless communication device in accordance with various embodiments.

Referring now to FIG. 2A, a block diagram 200-$a$ illustrates a node device 115-$j$ in accordance with various embodiments. The node device 115-$j$ may be an example of one or more aspects of the wireless communication devices 115 described with reference to FIG. 1. The node device 115-$j$ may also be a processor. The device 115-$j$ may include a receiver module 205, a Hybrid Wireless Mesh Protocol (HWMP) communication module 210, and a transmitter module 215. Each of these components may be in communication with each other.

The components of the device 115-$j$ may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions stored in a memory, formatted to be executed by one or more general or application-specific processors.

The transmitter module 215 may send communications via signals 208 from the node device 115-$j$ to devices, such as the mobile device 105 or other nodes 115 of the mesh network 110 shown in FIG. 1. Sending such communications may include messages such as PREQ and/or PREP to establish communication between the mobile device 105 and node device 115-$j$. The HWMP communication module 210 may manage such communications sent by the node device 115-$j$.

The receiver module 205 may receive communications via signals 202 from either another node device 115 or a mobile device 105 in accordance with establishing a path between the source node and the originator node. The receiver module 205 may receive PREQ and/or PREP messages transmitted from the mobile device 105 and/or other node device 115 in order to establish communication. The HWMP communication module 210 may manage such communications received by the node device 115-$j$ via signal(s) 204 (e.g., control and/or data). Additionally, the HWMP communication module 210 may establish connections with one or more of the member devices 115 of the mesh network 110 and may manage via signal(s) 206 (e.g., control and/or data) communications via such connections. Further details regarding the HWMP communication module 210 will be described below.

Figure 2B:
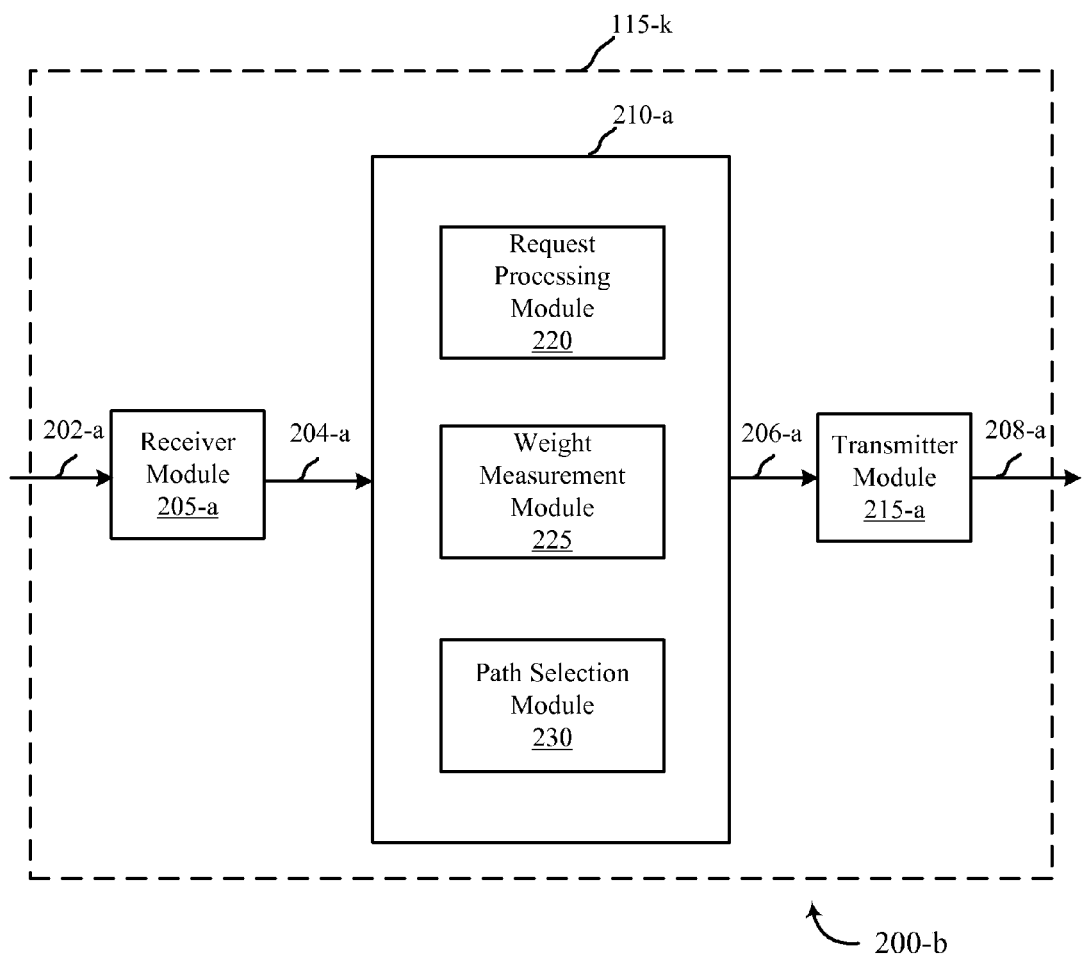
FIG. 2B is a block diagram illustrating a further embodiment of the wireless communication device.

FIG. 2B is a block diagram 200-$b$ illustrating a node device 115-$k$ in accordance with various embodiments. The node device 115-$k$ may be an example of one or more aspects of the node device 115 described with reference to FIGS. 1 and/or 2A. The device 115-$k$ may also be a processor. In some examples, node device 115-$k$ may be either a source node or intermediate node as described with reference to FIG. 1. The node device 115-$k$ may include a receiver module 205-$a$, a HWMP communication module 210-$a$, and a transmitter module 215-$a$. Each of these components may be in communication with each other.

The components of the device 115-$k$ may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions stored in a memory, formatted to be executed by one or more general or application-specific processors.

The receiver module 205-$a$ and the transmitter module 215-$a$ may be configured to perform operations (e.g., via signals 202-$a$, 204-$a$, 206-$a$, and 208-$a$) as previously described with reference to FIG. 2A. The HWMP communication module 210-$a$ may include a request processing module 220, weight measurement module 225, and a path selection module 230. The HWMP communication module 210-$a$ may be configured to perform the various functions described above with respect to FIG. 2A. In one example, the HWMP communication module 210-$a$ may manage (via internal signals (not shown)) processing of PREQ and PREP messages received from an originator node and/or source node. Format of the PREQ messages are described in greater detail below in the disclosure, infra, with reference to FIGS. 7 and 8.

In one configuration, the node device 115-$k$ may be an intermediate node between the source node and an originator node. In such instance, the request processing module 220, upon receiving a PREQ message initiated by an originator node, may identify the request as a unique request based in part on the request identification and the originator address field. Such processing may allow the request processing module 220 to detect duplicate reception of a PREQ message of the same route discovery at a node device 115-$k$. The request processing module 220 may further identify the type of request (i.e., unicast message or broadcast traffic) based in part on an analysis of at least one reserved bit identifying the PREQ message as a broadcast traffic request or a unicast message. In certain examples, the request processing module 220 may further identify an intermediate node between the node device 115-$k$ and the originator as a broadcast node based at least in part on one reserved bit in the PREQ message.

In yet a further example, the HWMP communication module 210-$a$ may comprise a weight measurement module 225 configured to calculate cumulative link weight between the node device 115-$k$ and the originator node. The weight measurement module 225 may consider routing metrics such as existing broadcast intermediate node(s), type of data request, and hop count in determining an optimal path between the source node and the originator node. The link weight may be a weighted sum of at least one or more of bit error rate, link quality, signal strength, or hop count. Following the weight measurement module 225 summing the link weight between each node between the device node 115-$k$ and the originator node, the path selection module 230 selects a path comprising the least cumulative weight to transfer a PREP message.

Figure 3:
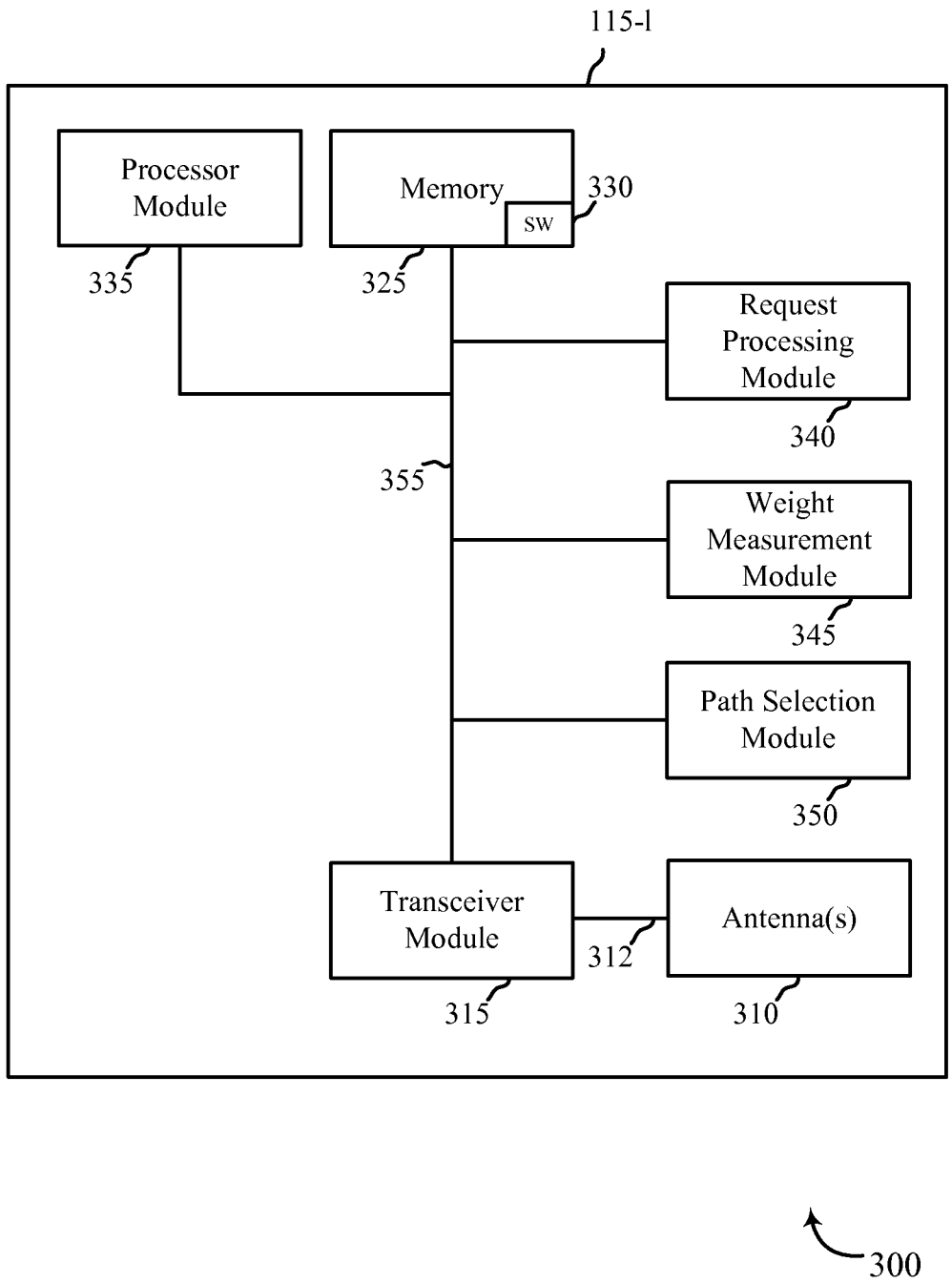
FIG. 3 is a block diagram of one configuration of a wireless communication device.

FIG. 3 is a block diagram 300 illustrating a device 115-1 according to various embodiments. The device 115-1 may operate as either as either a source node, intermediate node or a mobile device 105 as discussed with reference to FIG. 1. The device 115-1 may have any of various configurations, such as personal computers (e.g., laptop computers, netbook computers, tablet computers, etc.), cellular telephones, PDAs, digital video recorders (DVRs), internet appliances, gaming consoles, e-readers, etc. The device 115-1 may have an internal power supply (not shown), such as a small battery, to facilitate mobile operation.

In the configuration shown, the device 115-1 includes one or more antennas 310, a transceiver module 315, memory 325, a processor module 335, a request processing module 340, a weight measurement module 345, and a path selection module 350, which each may be in communication, directly or indirectly, with each other (e.g., via one or more buses 355). The transceiver module 315 is configured to communicate bi-directionally via signals 312 sent to and received from the antenna(s) 310, as described above. For example, the transceiver module 315 may be configured to communicate bi-directionally with other devices 105 and/or 115 of FIGS. 1, 2A, and/or 2B. The transceiver module 315 may include the receiver module 205 and the transmitter module 215 of FIGS. 2A and/or 2B, as previously described. In one embodiment, the transceiver module 315 may further include a modem configured to modulate packets and provide the modulated packets to the antenna(s) 310 for transmission, and to demodulate packets received from the antenna(s) 310. While the device 115-1 may include a single antenna, the device 115-1 will typically include multiple antennas 310 for multiple links.

The memory 325 may include random access memory (RAM) and read-only memory (ROM). The memory 325 may store computer-readable, computer-executable software code 330 containing instructions that are configured to, when executed, cause the processor module 335 to perform various functions described herein (e.g., identify/determine/obtain audio and/or video streams, graphics resources, and/or rendering instructions, receive, transmit, etc.). Alternatively, the software 330 may not be directly executable by the processor module 335 but be configured to cause the computer (e.g., when compiled and executed) to perform functions described herein.

The processor module 335 may include an intelligent hardware device, e.g., a central processing unit (CPU), a microcontroller, an application specific integrated circuit (ASIC), etc. The processor module 335 may include a speech encoder (not shown) configured to receive audio via a microphone, convert the audio into packets (e.g., 30 ms in length) representative of the received audio, provide the audio packets to the transceiver module 315, and provide indications of whether a user is speaking. Alternatively, an encoder may only provide packets to the transceiver module 315, with the provision or withholding/suppression of the packet itself providing the indication of whether a user is speaking.

The request processing module 340, the weight measurement module 345, and the path selection module 350 may be an example of one or more aspects of one of the respective modules 220, 225 and 230 described with reference to FIG. 2B. Thus, these modules may be configured to perform any of the various operations or provide the functionality described herein.

The components of the device 115-1 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors. Each of the noted modules may be a means for performing one or more functions related to operation of the device 105-*f* as described herein.

Figure 4A:
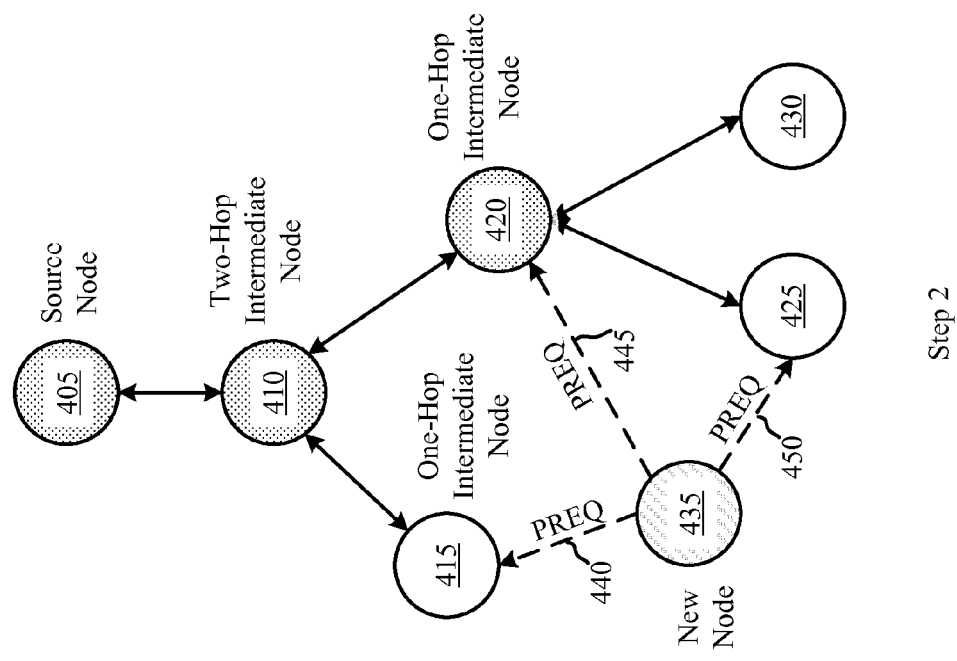
FIGS. 4A, and 4B shows a diagram illustrating the process of a wireless communication device joining a network with an existing broadcasting intermediate node in accordance with various embodiments.
Figure 4A:
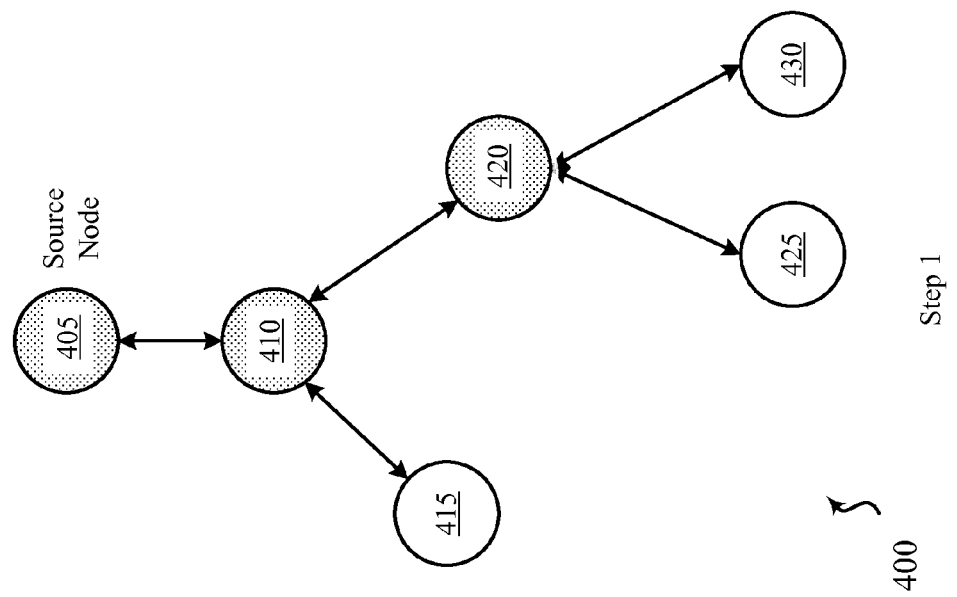
Figure 4B:
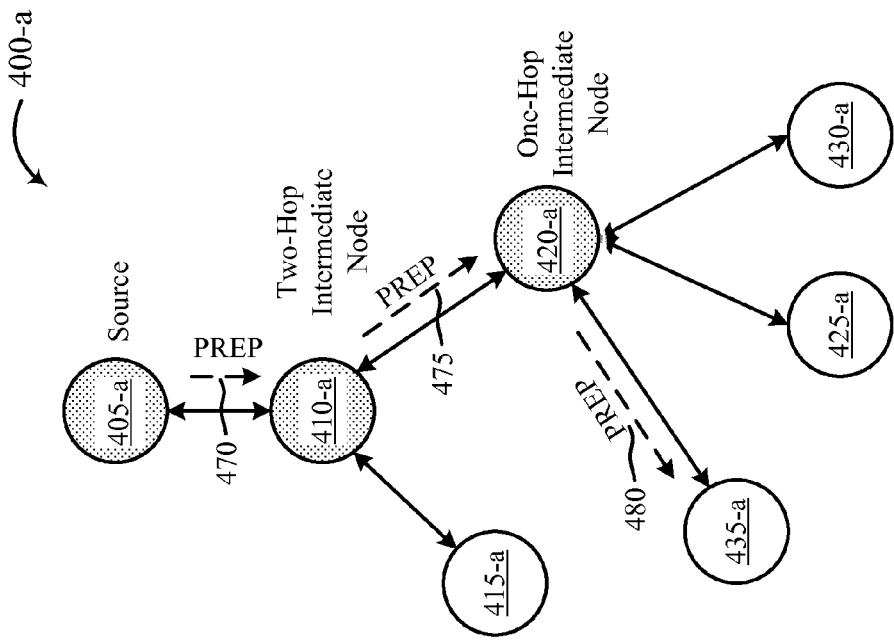
Figure 4B:
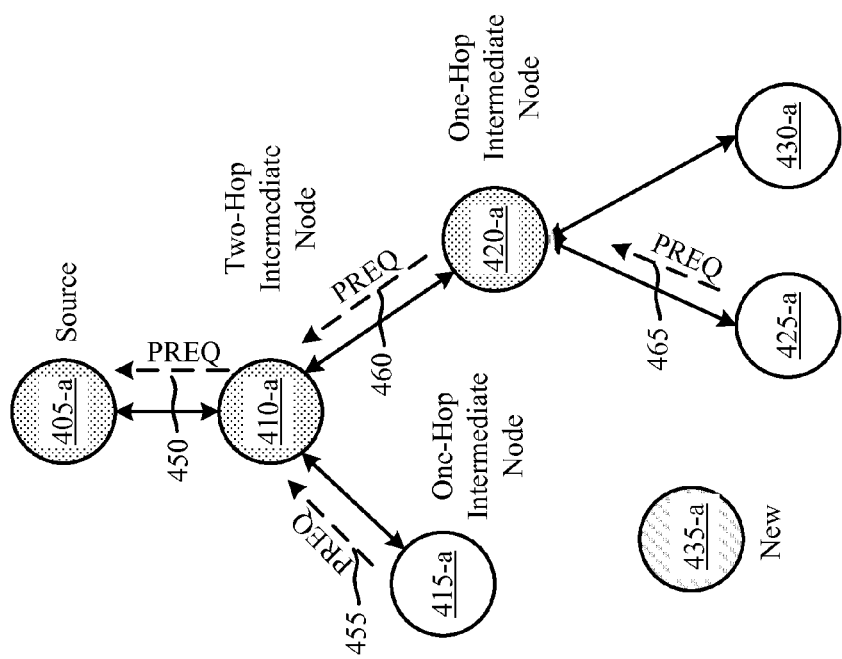

FIG. 4A and FIG. 4B, are diagrams 400 illustrating one example of communication between a source node and an originator node joining the mesh network. Now referring to FIG. 4A, a mesh network may comprise a plurality of nodes 405, 410, 415, 420, 425 and 430 as illustrated. Each of the node device(s) may be an example of one or more aspects of the node device 115 described with reference to FIGS. 1, 2A, 2B and/or FIG. 3. In one example, with reference to step 1, a source node 405 may broadcast traffic in the mesh network. In this example, an intermediate node 410 may be a subscriber node. The subscriber node 410 may further broadcast the received traffic from the source node 405 to additional nodes 415 and 420 in the mesh network. Similarly, node 420 may further relay the broadcast traffic received from the subscriber node 410 to nodes 425 and 430 that may be outside the range of either the source node 405 or the intermediate node 410. For the purpose of illustration, nodes 405, 410 and 420 configured to broadcast source traffic are marked with a shaded background. Although FIGS. 4A and 4B are illustrated with reference to a single source node, it should be apparent to those skilled in the art that a mesh network may extend to include any number of configurations, including a plurality of source nodes, each broadcasting unique data (e.g., video, audio, etc.).

In some examples, as illustrated in step 2, a new node (originator node) 435 may join the mesh network and request the broadcast traffic stream from the source node 405. In order to establish a path to the source node, the originator node may broadcast a PREQ message 440, 445, 450 to the mesh network. The PREQ message may identify the type of request and the source address associated with the request. In some examples, the new node 435 may use at least one reserved bit of the PREQ message to identify the traffic type (i.e., broadcast or unicast) for the requested route. Intermediate nodes 415, 420, and 425, within a range of the originator node 435, may each receive a PREQ message 440, 445 and 450 respectively. Upon receiving the PREQ messages, each intermediate node 415, 420, and 425 may process the received request by identifying the type of request received (i.e., unicast or broadcast), determining whether the intermediate node 415, 420, and 425 itself is actively broadcasting the requested data, and updating the PREQ message based in part on the determination. Therefore, in the above example, each intermediate node 415, 420, and 425 would determine the type of request received. However, only intermediate node 420 may identify itself as a broadcaster by updating at least one reserved bit in the PREQ message to reflect the determination.

In some examples, intermediate node(s) 415, 420, and 425 may further update the PREQ messages based on calculation of link metrics associated with the air-link between each node 415, 420, and 425 and the originator node 425. The link metrics may comprise factors such as physical proximity, hop count, and/or channel quality between the two nodes. Following the update of the PREQ message, each intermediate node may forward the request towards the source node in the mesh network Turning now to FIG. 4B, a diagram 400-*a* illustrates a continuation of the diagram 400 described in FIG. 4A. Referring to step 3 in FIG. 4B, each node 415-*a*, 420-*a*, and 425-*a* may propagate the received PREQ messages towards the source node 405-*a* in the mesh network. For example, node 415-*a* may forward the processed PREQ message 455 to the intermediate node 410-*a*. Similarly, nodes 420-*a* and 425-*a* may each propagate the processed PREQ messages 460, 465 towards the source node 405-*a* via reverse routes established in the network. At each interval, a node that receives the PREQ message may process and update the request prior to forwarding the PREQ message to a neighboring node in route to the source node 405-*a*.

For instance, a PREQ message 455 received at the intermediate node 410-*a* may be updated by the intermediate node 410-*a* to establish a cumulative link metric between node 410-*a* and originator node 435-*a* via the intermediate node 415-*a*. The cumulative link metric may indicate whether an intermediate node 415-*a*, along the path to the originating node 435-*a*, is actively broadcasting the requested data. Similarly, PREQ message 460 propagated from node 420-*a* to the intermediate node 410-*a* may also be updated by the intermediate node 410-*a* to establish a cumulative link metric between node 410-*a* and the originator node 435-*a* via intermediate node 420-*a*. In the instance of PREQ message 460, the intermediate node 410-*a* may determine by way of the cumulative link metric that the intermediate node 420-*a*, along the path to the originating node 435-*a* and within a one-hop distance of the originator, is a broadcaster of the requested data.

In some examples, an intermediate node 410-*a*, upon receiving a plurality of PREQ messages 455, 460 and 465 may forward the PREQ message 450 to the source node 405-*a*. In response, the source node 405-*a* may select the most optimal path to the originator node 435-*a* based in part on a cumulative link metric. The source node 405-*a*, as illustrated in step 4, may respond to the plurality of PREQ messages 450 by propagating a PREP message 470 back to the originator node 435 via selected paths.

In one configuration, an intermediate node 410-*a* that is two-hops removed from the originator node may be configured to select an optimal path to the originator node 435-*a*. The path selection may be based in part on a cumulative link metric that considers existing broadcasters in the mesh network along the path to the originator node 435-*a*. Therefore, in the above illustrated example, the intermediate node 410-*a* may determine that establishing a route to the originator node 435-*a* via a broadcasting intermediate node 420-*a* may be preferred or prioritized over a path via a non-broadcasting intermediate node 415-*a*. As a result, the intermediate node 410-*a* may select the path via broadcasting node 420-*a* by forwarding the PREP message 475 to the node 420-*a*. Thereafter, the intermediate node 420-*a* may forward the received PREP message 480 to the originator node 435-*a*, and thus establish a new path between the originator node 435-*a* and the source node 405-*a* without activating any new broadcasters in the mesh network.

Figure 5:
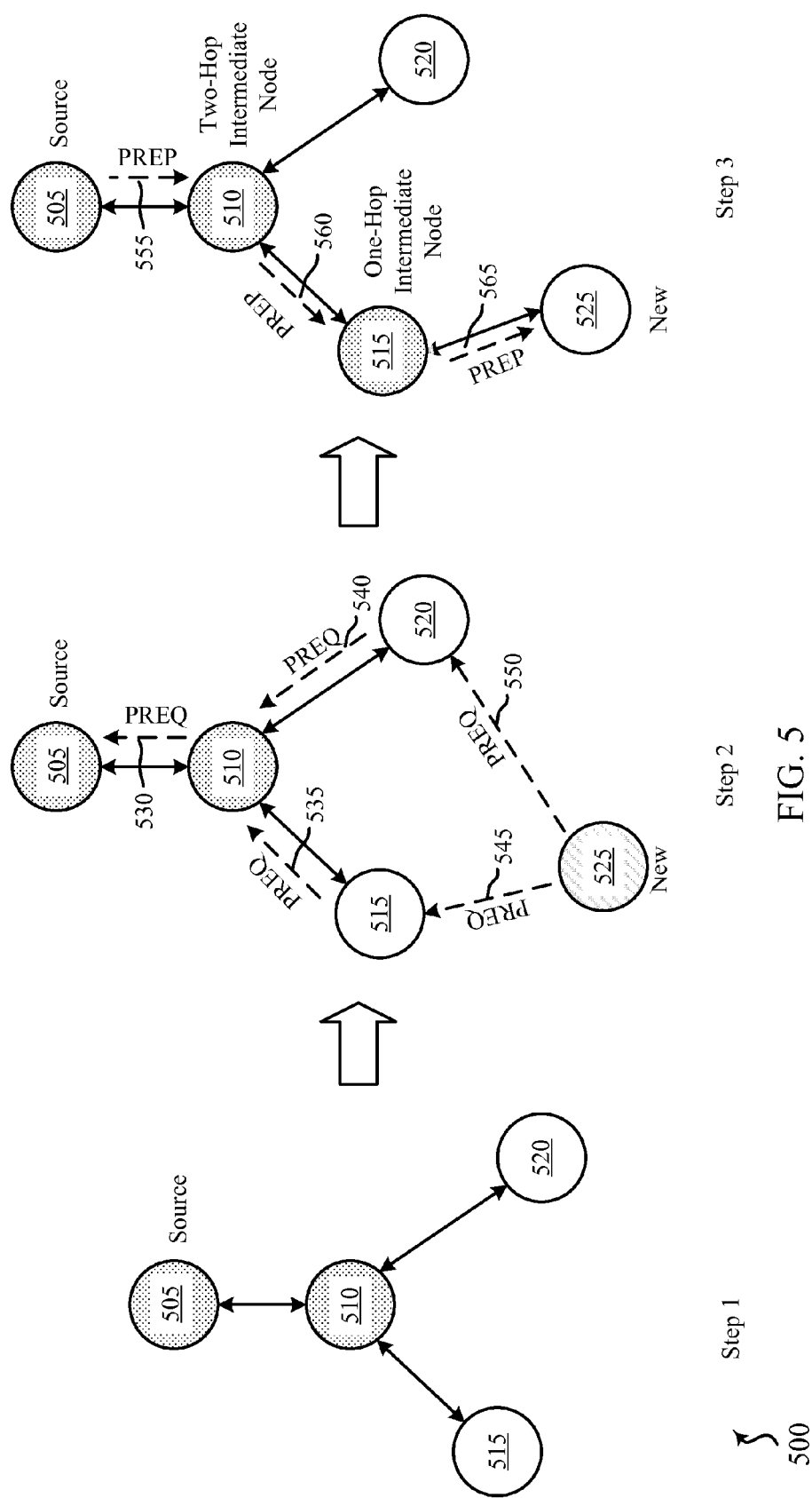
FIG. 5 shows a diagram illustrating the process of activating an intermediate node to broadcast traffic node in accordance with various embodiments.

FIG. 5 is a diagram 500 illustrating another example of communication between a source node and an originator node joining the mesh network. In contrast to the examples with reference to FIGS. 4A and 4B, diagram 500 illustrates an example of activating an intermediate node to broadcast source traffic when no active broadcasting node exists within a one-hop count of the originator node. Again, FIG. 5 shows a network comprising a plurality of nodes 505, 510, 515, and 520 in communication with a mesh network. Each of the node device(s) 505, 510, 515, and 520 may be an example of one or more aspects of the node device 115 described with reference to FIGS. 1, 2A, 2B, 3, and/or FIG. 4.

In one example, with reference to step 1, a source node 505 may broadcast traffic in the mesh network to an subscriber node 510. The subscriber node 510 may further broadcast the received traffic from the source node 505 to additional nodes 515 and 520 in the mesh network that may be outside the range of the source node 505. For the purpose of illustration, nodes 505 and 510 configured to broadcast source traffic are marked with a shaded background.

In some examples, as illustrated in step 2, a new node (originator node) 525 may join the mesh network and request the broadcast traffic stream from the source node 505. In order to establish a path to the source node, the originator node 525 may broadcast a PREQ message 545, 550 to the mesh network. Nodes 515, 520, within a range of the originator node 525, may each receive a PREQ message 545, 550 respectively. Upon receiving the PREQ messages 545, 550, each node 515, 520 may process the received request by identifying the type of request received (i.e., unicast or broadcast), determining whether the node 515, 520 itself is actively broadcasting the requested data, and updating the PREQ message based in part on the determination. In the illustrated example, neither node 515 nor 520 is broadcasting the requested data. As a result, the nodes 515 and 520 may each update its respective PREQ message to indicate to the next node 510, in route to the source node 505, their respective status. In some examples, the status may comprise indicating that the nodes 515 and 520 are not actively broadcasting any traffic.

In certain examples, node(s) 515, 520 may also update the PREQ messages 545, 550 based on calculation of link metrics associated with the air-link between each node 515, 520, and the originator node 525. The link metrics may comprise factors such as physical proximity, hop count, and/or channel quality between the two nodes. Following the update of the PREQ message, each node 515, 520 may propagate the PREQ messages 535, 540 towards the source node 505 via the intermediate node 510 in the mesh network. The neighbor node 510 may further transmit the PREQ messages 530 to the source node 505 in accordance with the one example.

In response to the PREQ message 530, the source node 505, as shown in step 3, may reply with a PREP message 555 propagated to the originator node 525 via selected paths on the mesh network. The intermediate node 510, upon receiving the PREP message 555, may select an optimal path to the originator node from a plurality of available paths. In certain examples, the intermediate node 510 may choose to activate node 515 to broadcast source traffic when no broadcaster exists within a one-hop count of the originator node 525. In some examples, the intermediate node 510 may activate node 515 based on the calculation of a least cumulative link path to the originator node 525. Therefore, the intermediate node 510 may transmit the PREP message 560 to the intermediate node 515 activating the node 515 to begin broadcasting the source traffic. In response, the intermediate node 515 may further forward the PREP message 565 to the originator node 525 to establish a bidirectional communication.

Figure 6:
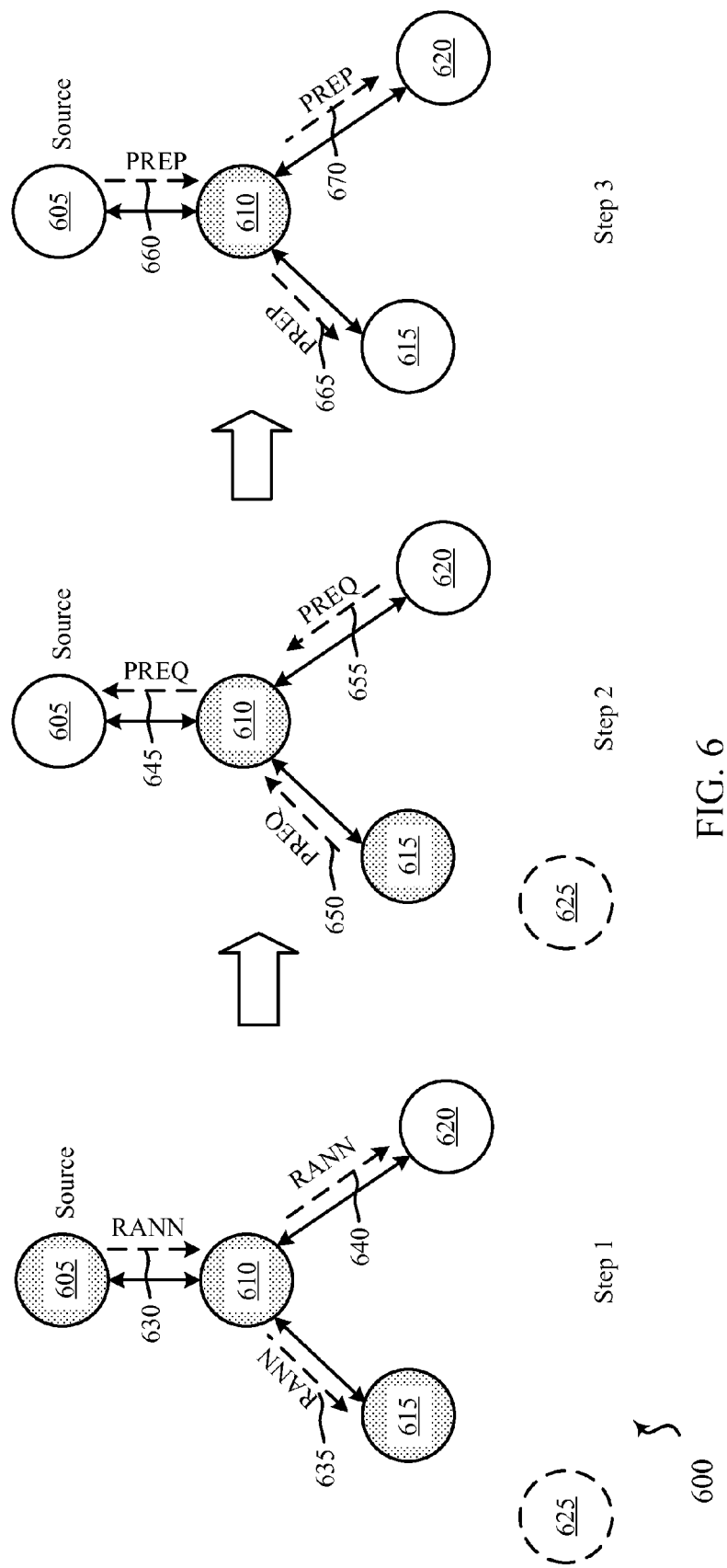
FIG. 6 shows a diagram illustrating steps of refreshing the path of each node in the mesh network in accordance with various embodiments.

FIG. 6 is a diagram 600 illustrating yet another example of communication in the mesh network in accordance with the present disclosure. Mobile devices or nodes operating in a mesh network are actively moving in and out of the network. Therefore, it may be necessary to periodically refresh the paths between a plurality of nodes to reflect the changes in the network. FIG. 6 illustrates a mesh network comprising a plurality of nodes 605, 610, 615, 620, and 625. Each of the node device(s) 605, 610, 615, 620, and 625 may be an example of one or more aspects of the node device 115 described with reference to FIGS. 1, 2A, 2B, 3, 4 and/or FIG. 5.

In one example, FIG. 6 illustrates a node 625 which may either leave the mesh network or cease to communicate with the intermediate node 615. As a result, it may no longer be necessary for the intermediate node 615 to continue broadcasting traffic as there are no subscriber nodes communicating with the intermediate node 615. In such instances, a source node 605, as illustrated in step 1, may periodically issue a route announcement (RANN) broadcast message to be propagated throughout the mesh network. The periodicity of the RANN message may be dynamic and adjusted to reduce messaging overhead. In some examples, the announcements, including RANN, PREQ, and PREP messages are issued during a paging window at the beginning of each transmission. Such timing insures that all participating nodes 605, 610, 615, 620, 625 are awake to listen (or send) their respective transmission indication.

In certain examples, nodes 610, 615, 620, 625 receiving the RANN broadcast message 630, 635, 640 may identify the RANN message as a provider announcement based in part on the flags associated with the received message. The RANN messages 630, 635, 640 may be encrypted using mesh network key so as to allow only the mesh members to process the request. Now referring to step 2, node(s) 610, 615, 620 in the mesh network may refresh their routes by transmitting a PREQ message 645, 650, 655 to the source node 605 in response to the RANN message 630, 635, 640. As shown in step 3, the source node (or root node), upon receiving the PREP messages from at least one node, may send a PREP message 660, 665, 670 to the nodes 610, 615, 620 in the mesh network in order to create or refresh new routes. Thus, as illustrated in step 3, node 615 may refresh its route and cease to broadcast traffic upon reception of a PREP message 665 from the source node when it is deemed no longer necessary for the node 615 to continue broadcasting traffic.

Although FIG. 6 is illustrated from a perspective of a single source node, those of ordinary skill in the art would appreciate that the Social Wi-Fi mesh network may comprise any number of providers. Each provider may have a unique 6-bit identification (ID) derived from its MAC address to identify each provider as a source node to a plurality of nodes in the mesh network. In yet another example, the providers may be identified to the mesh nodes by the address field in the RANN message. In such examples, reserved bits of the RANN message may be used to identify at least one instance of the service being provided by the source node 605. For example, a source node 605 may be configured to provide multiple instances of the same broadcast traffic (i.e., hi quality and/or low quality of a specific video). Therefore, reserved bits in the RANN message may be utilized to identify each of the high quality and low quality video stream instance separately utilizing the reserved bits in the RANN message.

Figure 7:
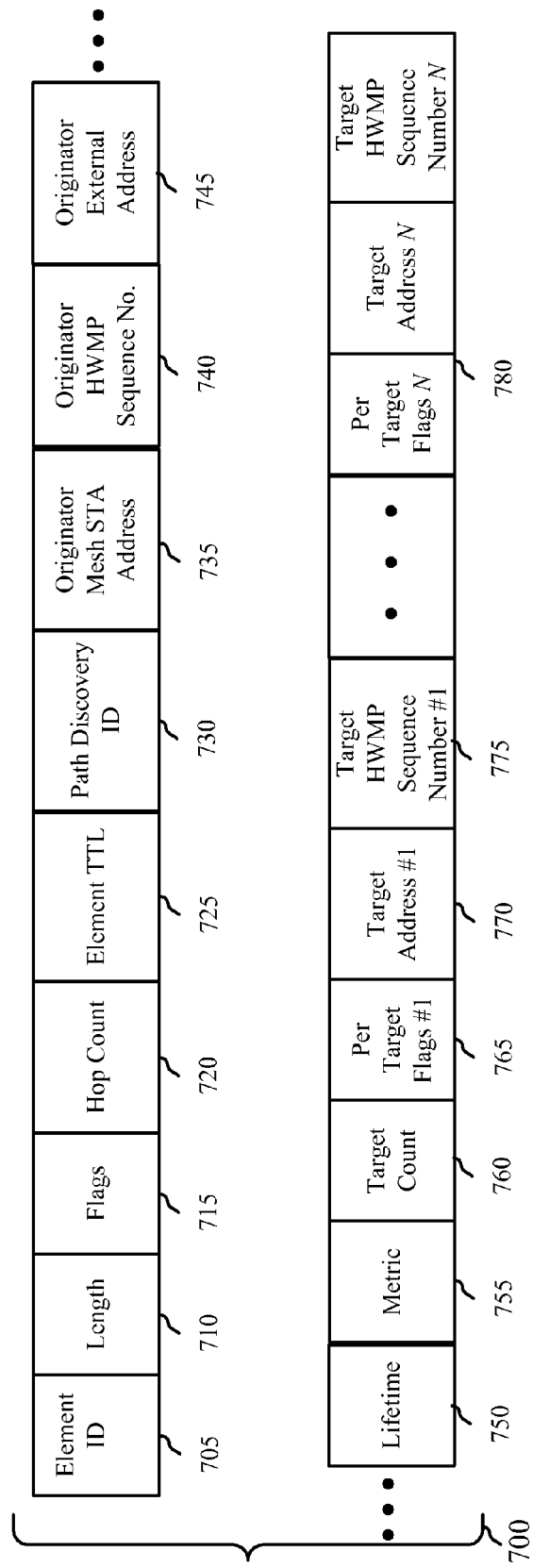
FIG. 7 is an example of a frame structure of a path request (PREQ) message in accordance with various aspects of the present disclosure.

FIG. 7 illustrates a frame structure of a PREQ message 700 in accordance with one example of Hybrid Wireless Mesh Protocol (HWMP). The PREQ message structure may identify an element ID 705, length 710, flags 715, hop count 720, element TTL 725, path discovery ID 730, originator mesh station address 735, originator HWMP Sequence number 740, originator external address 745, lifetime 750, metric 755. In addition, HWMP allows a node to discover path to multiple target nodes simultaneously with a single PREQ message. As a result, the target count field 760 may specify the number of target nodes requested. It would be understood by those of ordinary skill in the art that the per target fields 780 may be repeated for each target node for which path discovery is requested.

In some examples, element ID 705 in combination with the originator mesh station address 735 may uniquely identify a PREQ message and prevent a node device from processing duplicate reception of the same PREQ. The PREQ message frame structure further allows utilization of flag field 715 to associate controls flags comprising shared value for each target node. The hop count field 720 and the metric fields 755 may provide information on the number of links in the path and link metrics utilized in selection of an optimal path between the source and originator node. Further details regarding the utilization of flag fields will be described below.

Figure 8:
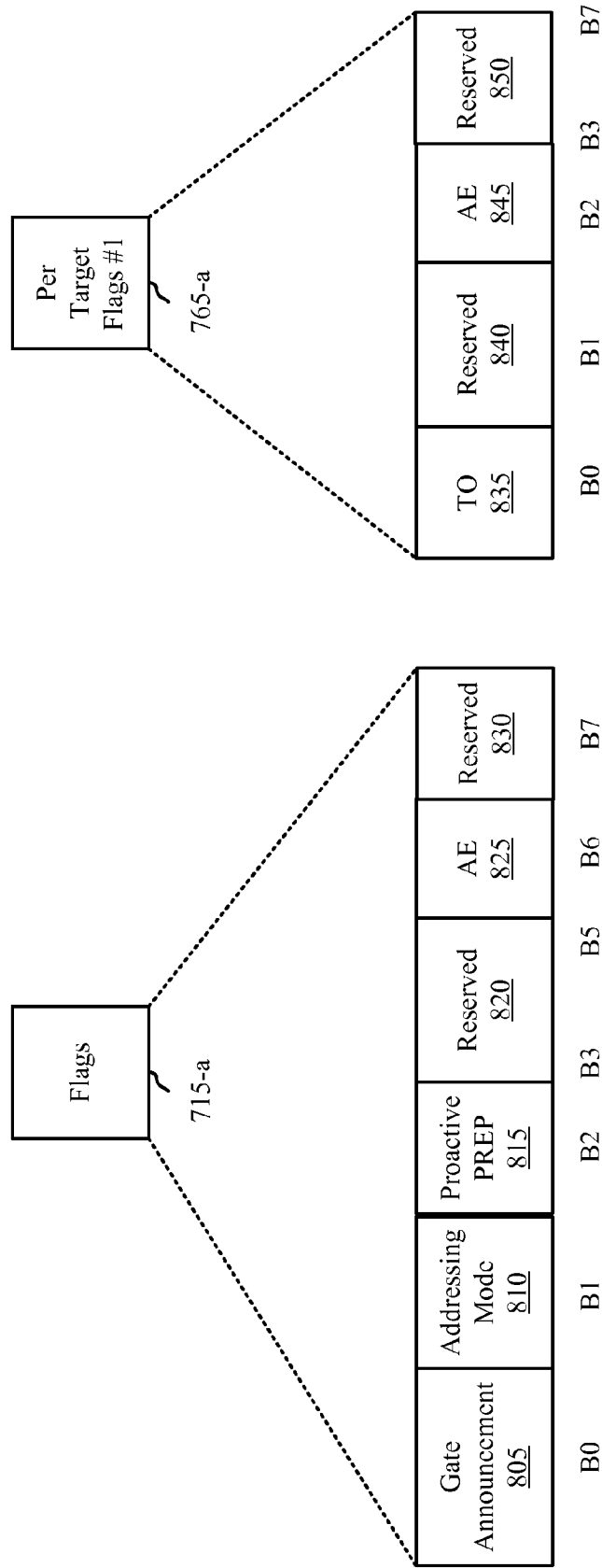
FIG. 8 is an example of a frame structure of a path request (PREQ) message in accordance with aspects of the present disclosure.

FIG. 8 illustrates a frame structure of a PREQ message focusing exclusively on the flag 715-a and per target flag fields 765-a as described with reference to FIG. 7. Each of the flag fields 715-a and per target flag field 765-a may be one octets (8 bits) in length. In one example, the mobile devices utilize reserved bits 820 and 830 of the flag 715-a to indicate that the PREQ message is associated with a broadcast traffic and to identify existing broadcasters for the source of the broadcast traffic. For instance, an originator node, when issuing a PREQ message to the mesh network may utilize at least one of the reserved bits 820 or 830 to identify the type of request as a broadcast request. Similarly, an intermediate node processing the received PREQ message may determine that the intermediate node itself is a broadcaster of the requested traffic and update at least one of the reserved bits 820 or 830 prior to forwarding the PREQ message to the source node. As a result, the intermediate node may signal to the source node that a broadcaster exists along the path to the originator node.

In yet further example, the originator node may set the TO bit 835 of the per target flat 765-a to identify whether a source node or at least one intermediate node may issue a PREP message in response to the received PREQ request. For instance, if the TO bit 835 is set to "1" (TO=1), only the source node may create a PREP in response to the PREQ message. Alternatively, if the TO bit 835 is set to "0" (TO=0), an intermediate node with an established path to the source node may issue a PREP to the originator.

Figure 9:
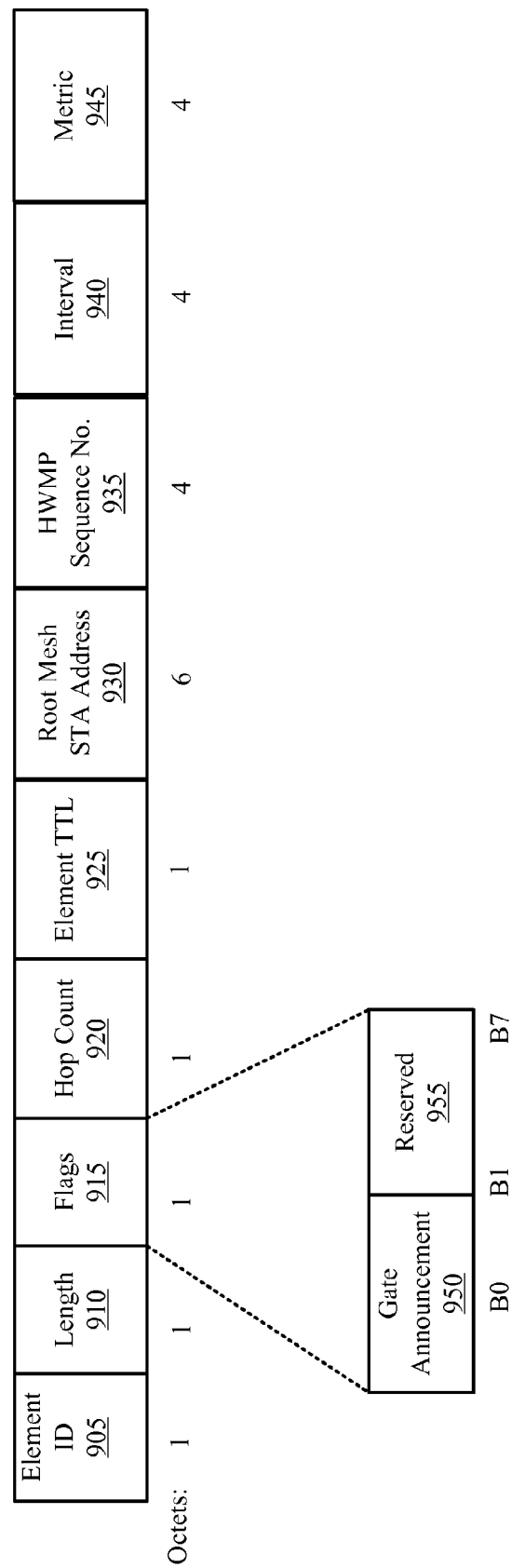
FIG. 9 is an example of a frame structure of a route announcement (RANN) message in accordance with aspects of the present disclosure.

FIG. 9 illustrates a frame structure of a RANN message in accordance with one example of improved HWMP protocol. The frame may comprise an element ID 905, length 910, flags 915, hop count 920, element TTL 925, root mesh station address 930, HWMP sequence number 935, interval 940, and metric 945 fields. In some examples, nodes may identify RANN message and the provider based in part on the element ID 905 and the root mesh station address 930. In one configuration, multiple providers in the Social Wi-FI mesh network may store a unique 6-bit ID derived from the provider MAC address in the reserved field 955 to identify each provider.

In yet another example, at least one reserved bit 955 of the RANN message may be used to identify at least an instance of a plurality of services being provided by the source node. For example, a source node may be configured to provide multiple instances of the same broadcast traffic (i.e., hi quality and/or low quality of a specific video). Therefore, the source node may utilize at least one reserved bit 955 in the RANN message to uniquely identify each instance of the source broadcast traffic supported by the source node. As a result, the requesting node (e.g., new node) may use at least one reserved bit in the PREQ message to indicate the instance that the requesting node is interested in. For example, the six reserved bits (B1-B7) of the RANN flag 955 may be split such that the first three bits are used to indicate the provider announcement and the next three may indicate the instance of the traffic supported by the source node. Thus, when the requesting node requests a route to broadcast traffic, the requesting node may indicate the instance of the broadcast traffic that the requesting node is interested in by utilizing at least one reserved bit in the PREQ message.

Figure 10:
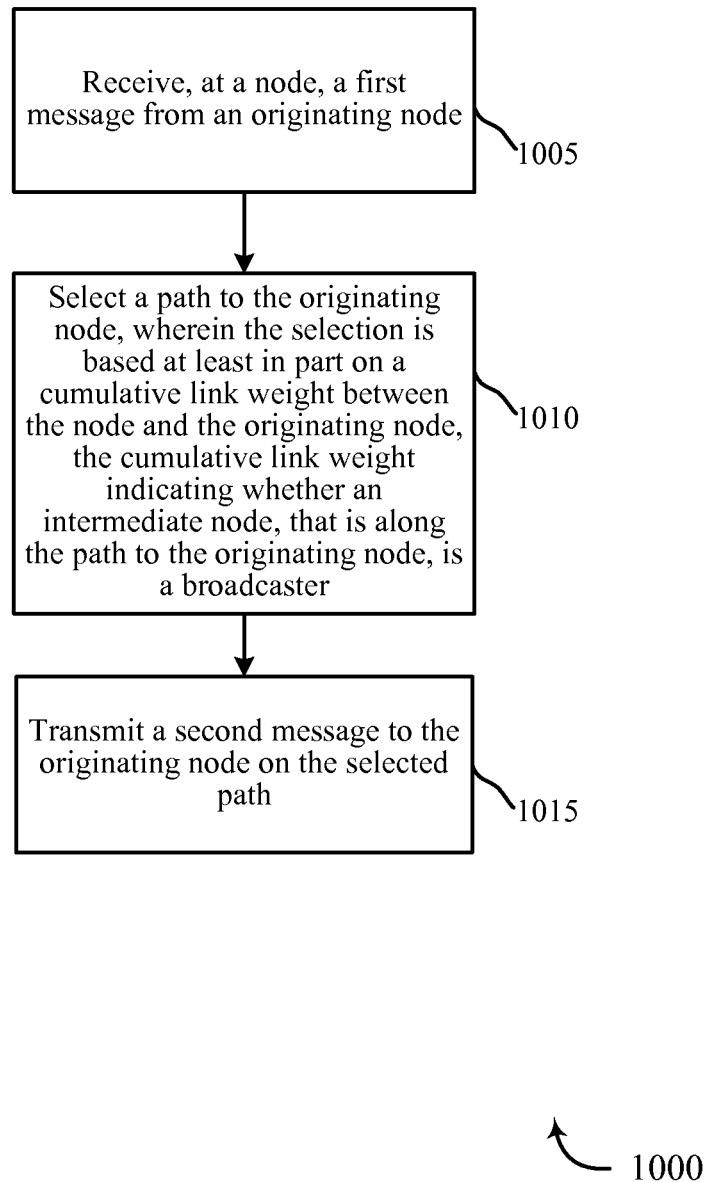
FIG. 10 is a flow chart illustrating an embodiment of a method for communications via a mesh network.

FIG. 10 is a flowchart illustrating an embodiment of a method 1000 performed by a node device 115 for communications via a mesh network. For clarity, the method 1000 is described below with reference to the arrangement 100 shown in FIG. 1, and/or with reference to one of the devices 115 described with reference to FIGS. 1, 2A, 2B, 3, 4, 5 and/or 6. In one implementation, the HWMP communication module 210 described with reference to FIGS. 2A, 2B may execute one or more sets of codes to control the functional elements of a mobile device 115 to perform the functions described below.

In one embodiment, at block 1005, the node device 115 may receive a first message from an originating node. The first message may comprise a PREQ message received at the node device 115. The operation(s) of block 1005 may be performed by the receiver module 205 described with reference to FIGS. 2A and/or 2B.

At block 1010, the node device 115 may select a path to the originating node. In some examples, the originating node may be a new node that issued the PREQ message to the mesh network. In some examples, the path selection may be based at least in part on a cumulative link weight between the node and the originating node. The cumulative link weight may indicate whether an intermediate node, that is along the path to the originator node, is a broadcaster. The operation(s) of block 1010 may be performed by the HWMP communication module 210 as described with reference to FIGS. 2A and/or 2B.

At block 1015, the node device 115 may further transmit a second message to the originating node on the selected path. In some examples, the second message may be a PREP message propagated to the originator node via the selected paths. The operation(s) of block 1015 may be performed by the transmitter module 215 as described with reference to FIGS. 2A and/or 2B.

Figure 11:
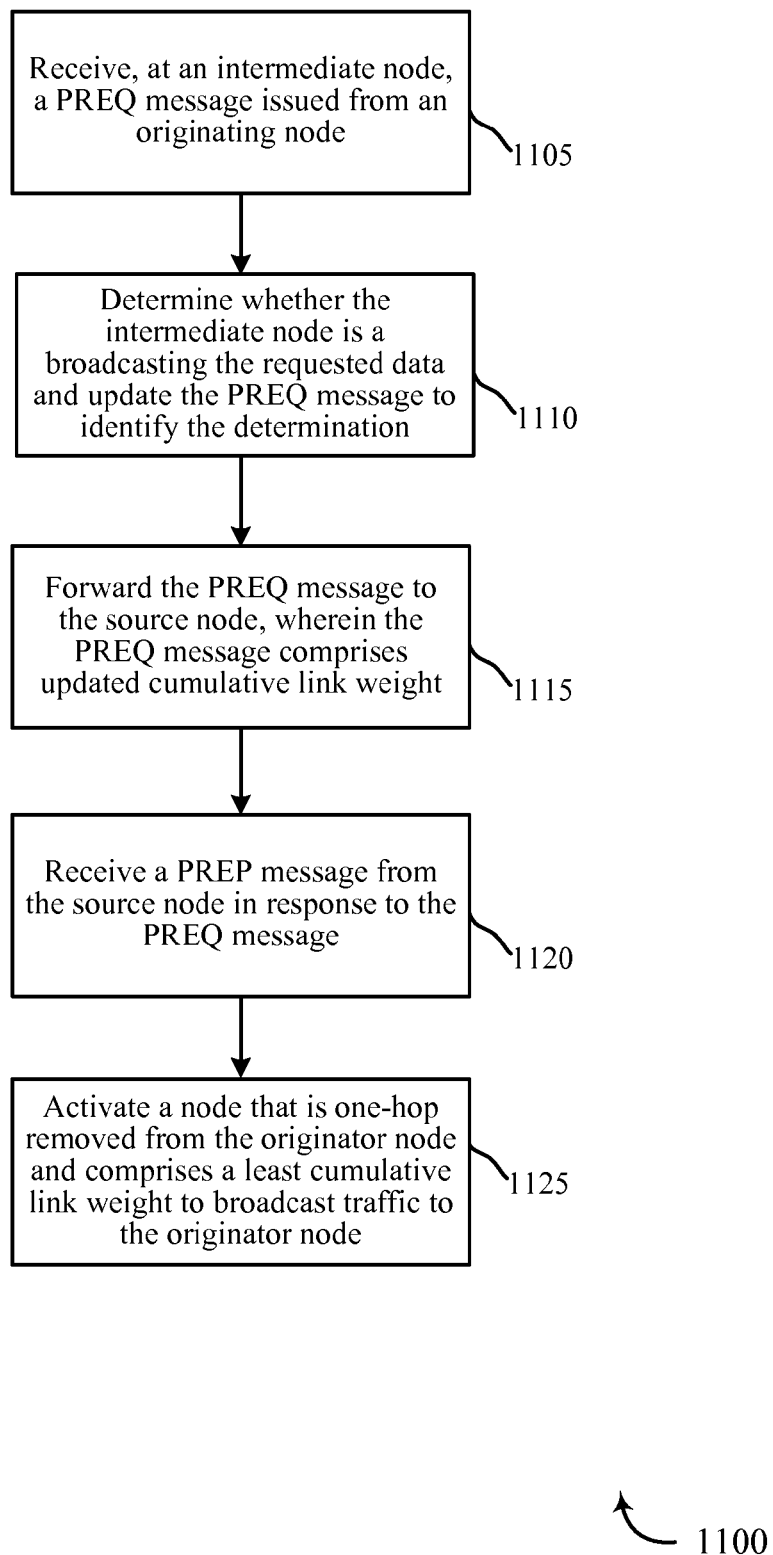
FIG. 11 is a flow chart illustrating an embodiment of a method for communications via a mesh network.

FIG. 11 is a flowchart illustrating an embodiment of a method 1100 performed by a node device 115 for communications via a mesh network. For clarity, the method 1100 is described below with reference to the arrangement 100 shown in FIG. 1, and/or with reference to one of the devices 115 described with reference to FIGS. 1, 2A, 2B, 3, 4, 5 and/or 6. In one implementation, the HWMP communication module 210 described with reference to FIGS. 2A, 2B may execute one or more sets of codes to control the functional elements of a mobile device 115 to perform the functions described below.

In one embodiment, at block 1105, an intermediate node device 115 may receive a PREQ message from an originating node. The PREQ message may be a broadcast request issued by the originating node requesting subscription to the source data being broadcast (e.g., video/audio The operation(s) of block 1105 may be performed by the receiver module 205 described with reference to FIGS. 2A and/or 2B.

At block 1110, the intermediate device 115 may determine whether the intermediate node itself is broadcasting the requested data. Based in part on the determination, the intermediate node may update at least one reserved bits in the PREQ message. The operation(s) of block 1110 may be performed by the HWMP communication module 210 as described with reference to FIGS. 2A and/or 2B.

At block 1115, the intermediate node device 115 may forward the PREQ message to the source node. The forwarded PREQ message may comprise an updated cumulative link weight identifying nodes, along the path to the originator node, that may be actively broadcasting requested data. The operation(s) of block 1115 may be performed by the transmitter module 215 as described with reference to FIGS. 2A and/or 2B. In response to the transmitted PREQ message, at block 1120, an intermediate node device 115 may receive a PREP message from the source node to be propagated to the originator node via selected path. The operation(s) of block 1120 may be performed by the receiver module 205 described with reference to FIGS. 2A and/or 2B.

At block 1125, the intermediate node device 115 may determine that no broadcaster exists within a one-hop count of the originator node. As a result, the intermediate node device may activate a node that is one-hop removed along from the originator node and comprises a least cumulative weight to broadcast source traffic to the originator node. The node device 115 may activate the node by transmitting a PREP message to the node that is one-hop removed from the originator node. The operation(s) of block 1120 may be performed by the HWMP communication module and path selection module described with reference to FIGS. 2A and/or 2B.

Figure 12:
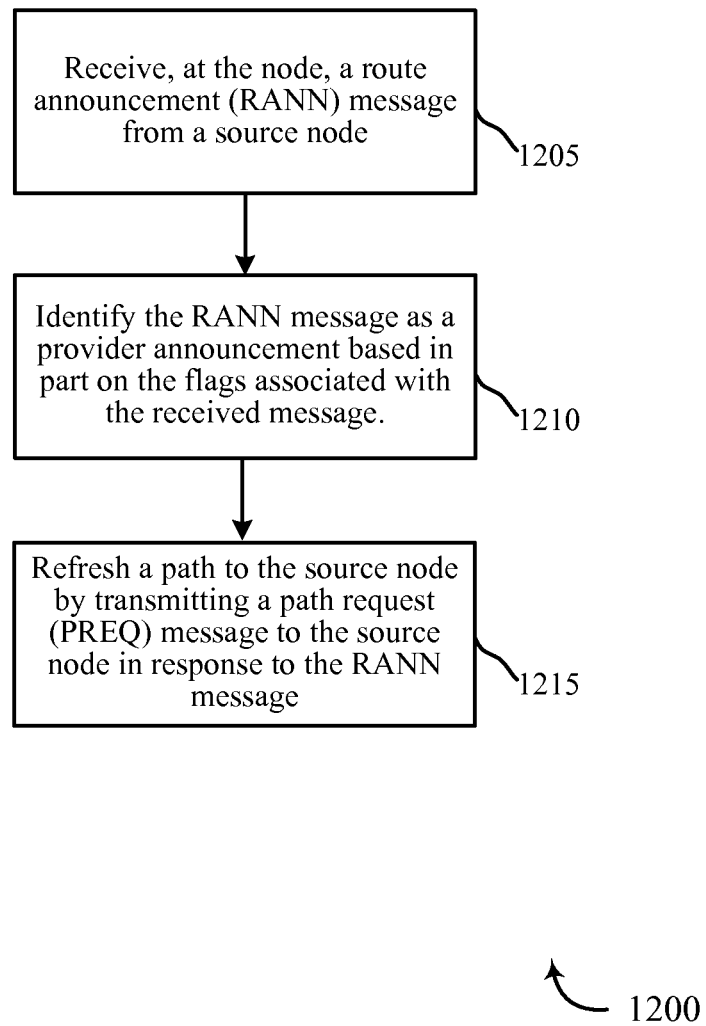
FIG. 12 is a flow chart illustrating an embodiment of a method for communications via a mesh network.

FIG. 12 is a flowchart illustrating an embodiment of a method 1200 performed by a node device 115 for communications via a mesh network. For clarity, the method 1200 is described below with reference to the arrangement 100 shown in FIG. 1, and/or with reference to one of the devices 115 described with reference to FIGS. 1, 2A, 2B, 3, 4, 5 and/or 6. In one implementation, the HWMP communication module 210 described with reference to FIGS. 2A, 2B may execute one or more sets of codes to control the functional elements of a mobile device 115 to perform the functions described below.

In one embodiment, at block 1205, the node device 115 may receive a RANN message from a source node. The operation(s) of block 1105 may be performed by the receiver module 205 described with reference to FIGS. 2A and/or 2B.

At block 1210, the node device 115 receiving the RANN broadcast message may identify the RANN message as a provider announcement based in part on the flags associated with the received message. The RANN message may be encrypted using mesh network key so as to only allow the mesh members to process the request. The operation(s) of block 1210 may be performed by the HWMP communication module 210 as described with reference to FIGS. 2A and/or 2B.

At block 1215, the node device 115 may refresh a path to the source node by transmitting a PREQ message to the source node. The operation(s) of block 1015 may be performed by the transmitter module 215 as described with reference to FIGS. 2A and/or 2B.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Thus, the description set forth above provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communication, the method comprising:
   receiving, at a node, a request message from an originating node to broadcast a type of data;
   selecting a path to the originating node, wherein the selection is based at least in part on a link weight between the node and the originating node, the link weight indicating whether at least one intermediate node, along the path to the originating node, is a broadcaster of the type of data associated with the request message; and
   transmitting a response message to the originating node on the selected path.

2. The method of claim 1, wherein the first message is a path request (PREQ) message to form a data path between a source node and the originating node, and the second message is a path reply (PREP) message, the PREQ message comprising information for reducing duplicate transmitting of the response message on a number of links in the data path.

3. The method of claim 1, wherein the node is two-hops removed from the originating node.

4. The method of claim 1, wherein a first of the at least one intermediate node is one-hop removed from the originating node.

5. The method of claim 4, further comprising:
   activating the first intermediate node to broadcast traffic upon determining that no broadcaster exists within a one-hop count of the originating node.

6. The method of claim 5, wherein activating the first intermediate node to broadcast traffic comprises transmitting the second message to the first intermediate node.

7. The method of claim 1, further comprising:
   determining that the received first message is a path request for broadcast traffic, wherein the determining is based at least in part on at least one or more bits in the first message.

8. The method of claim 7, wherein the one or more bits are reserved bits.

9. The method of claim 1, wherein the link weight is a weighted sum of at least one or more of bit error rate, link quality, signal strength, or hop count.

10. The method of claim 1, wherein the at least one intermediate node, along a least cumulative link weight path, is identified as the broadcaster based in part on one or more bits in the first message.

11. The method of claim 10, wherein the one or more bits are reserved bits in the first message.

12. A method of wireless communication, the method comprising:
    receiving, at a first node, a message from an originating node to broadcast a type of data;
    determining that the first node is broadcasting traffic associated with the type of data requested by the originating node in the message;
    updating, based in part on the determination, at least one bit in the message; and
    forwarding the message to a second node.

13. The method of claim 12, wherein the first node is an intermediate node one-hop removed from the originating node and the second node is at least one of second intermediate node or a source node.

14. The method of claim 13, wherein the second node is two-hops removed from the originating node along the path to a source of broadcast traffic.

15. The method of claim 12, wherein updating at least one bit in the message comprises updating at least one reserved bit in the message to identify the first node as a broadcaster.

16. The method of claim 12, wherein the message is a path request (PREQ) message comprising information for reducing duplicate transmitting of the message on a number of links.

17. The method of claim 12, further comprising:
receiving, at the first node, a route announcement (RANN) message from a source node; and
refreshing a path to the source node by transmitting a path request (PREQ) message to the source node in response to the RANN message.

18. The method of claim 17, wherein the RANN message comprises at least one of source media access control (MAC) address, a sequence number, a hop count, and a metric field.

19. The method of claim 18, wherein the source node is identified based at least in part on one of media access control (MAC) addresses of the source node, or a unique identification derived from the MAC address.

20. An apparatus for wireless communication, comprising:
a processor;
a memory in electronic communications with the processor, the memory embodying instructions, the instructions being executable by the processor to:
receive, at a node, a request message from an originating node to broadcast a type of data;
select a path to the originating node, wherein the selection is based at least in part on a link weight between the node and the originating node, the link weight indicating whether at least one intermediate node, along the path to the originating node, is a broadcaster of the type of data associated with the request message; and
transmit a response message to the originating node on the selected path.

21. The apparatus of claim 20, wherein the first message is a path request (PREQ) message to form a data path between a source node and the originating node, and the second message is a path reply (PREP) message, the PREQ message comprising information for reducing duplicate transmitting of the response message on a number of links in the data path.

22. The apparatus of claim 20, wherein the node is two-hops removed from the originating node.

23. The apparatus of claim 20, wherein a first of the at least one intermediate node is one-hop removed from the originating node.

24. The apparatus of claim 23, further comprising instructions being executable by the processor to:
activate the first intermediate node to broadcast traffic upon determining that no broadcaster exists within a one-hop count of the originating node.

25. The apparatus of claim 24, wherein activating the first intermediate node to broadcast traffic comprises transmitting the second message to the first intermediate node.

26. The apparatus of claim 20, further comprising instructions being executable by the processor to:
determine that the received first message is a path request for broadcast traffic, wherein the determining is based at least in part on at least one or more bits in the first message.

27. The apparatus of claim 26, wherein the one or more bits are reserved bits.

28. The apparatus of claim 26, wherein the link weight is a weighted sum of at least one or more of bit error rate, link quality, signal strength, or hop count.

29. The apparatus of claim 20, wherein the at least one intermediate node, along a least cumulative link weight path, is identified as the broadcaster based in part on one or more bits in the first message.

30. The apparatus of claim 29, wherein the one or more bits are reserved bits in the first message.

31. An apparatus for wireless communication, comprising:
a processor;
a memory in electronic communications with the processor, the memory embodying instructions, the instructions being executable by the processor to:
receive, at a first node, a message from an originating node to broadcast a type of data;
determine that the first node is broadcasting traffic associated with the type of data requested by the originating node in the message;
update, based in part on the determination, at least one bit in the message; and
forward the message to a second node.

32. The apparatus of claim 31, wherein the first node is an intermediate node one-hop removed from the originating node and the second node is at least one of second intermediate node or a source node.

33. The apparatus of claim 32, wherein the second node is two-hops removed from the originating node along the path to a source of broadcast traffic.

34. The apparatus of claim 31, wherein updating at least one bit in the message comprises updating at least one reserved bit in the message to identify the first node as a broadcaster.

35. The apparatus of claim 31, wherein the message is a path request (PREQ) message comprising information for reducing duplicate transmitting of the message on a number of links.

36. The apparatus of claim 31, further comprising instructions being executable by the processor to:
receive, at the first node, a route announcement (RANN) message from a source node; and
refresh a path to the source node by transmitting a path request (PREQ) message to the source node in response to the RANN message.

37. The apparatus of claim 36, wherein the RANN message comprises at least one of source media access control (MAC) address, a sequence number, a hop count, and a metric field.

38. The apparatus of claim 37, wherein the source node is identified based at least in part on one of media access control (MAC) addresses of the source node, or a unique identification derived from the MAC address.

39. An apparatus for wireless communication, comprising:
a receiver module receiving, at a node, a request message from an originating node to broadcast a type of data;
a hybrid wireless mesh protocol communication module for a path to the originating node, wherein the selection is based at least in part on a link weight between the node and the originating node, the link weight indicating whether at least one intermediate node, along the path to the originating node, is a broadcaster of the type of data associated with the request message, along the path to the originating node, is a broadcaster; and
a transmitter module for transmitting a response message to the originating node on the selected path.

40. The apparatus of claim 39, wherein the first message is a path request (PREQ) message to form a data path between a source node and the originating node, and the second message is a path reply (PREP) message, the PREQ message comprising information for reducing duplicate transmitting of the response message on a number of links in the data path.

41. The apparatus of claim 39, wherein the source node is two-hops removed from the originating node, and a first of the at least one intermediate node is one-hop removed from the originating node.

42. The apparatus of claim 41, further comprising:
a path selection module for activating the first intermediate node to broadcast traffic upon determining that no broadcaster exists within a one-hop count of the originating node.

43. The apparatus of claim 42, wherein activating the first intermediate node to broadcast traffic comprises transmitting the second message to the first intermediate node.

44. The apparatus of claim 39, further comprising:
a request processing module for determining that the received first message is a path request for broadcast traffic, wherein the determining is based at least in part on at least one or more bits in the first message.

45. The apparatus of claim 39, wherein the one or more bits are reserved bits.

46. The apparatus of claim 39, wherein the link weight is a weighted sum of at least one or more of bit error rate, link quality, signal strength, or hop count.

47. The apparatus of claim 39, wherein the at least one intermediate node, along a least cumulative link weight path, is identified as the broadcaster based at least in part on at least one or more bits in the first message.

48. The apparatus of claim 47, wherein the one or more bits are reserved bits in the first message.

* * * * *